March 10, 1970     DE FORREST D. BUTLER     3,499,570
COVER ASSEMBLY FOR A JUNCTION BOX OF AN UNDERFLOOR
ELECTRICAL WIRING SYSTEM Filed July 1, 1968     2 Sheets-Sheet 1

INVENTOR.
DE FOREST D. BUTLER

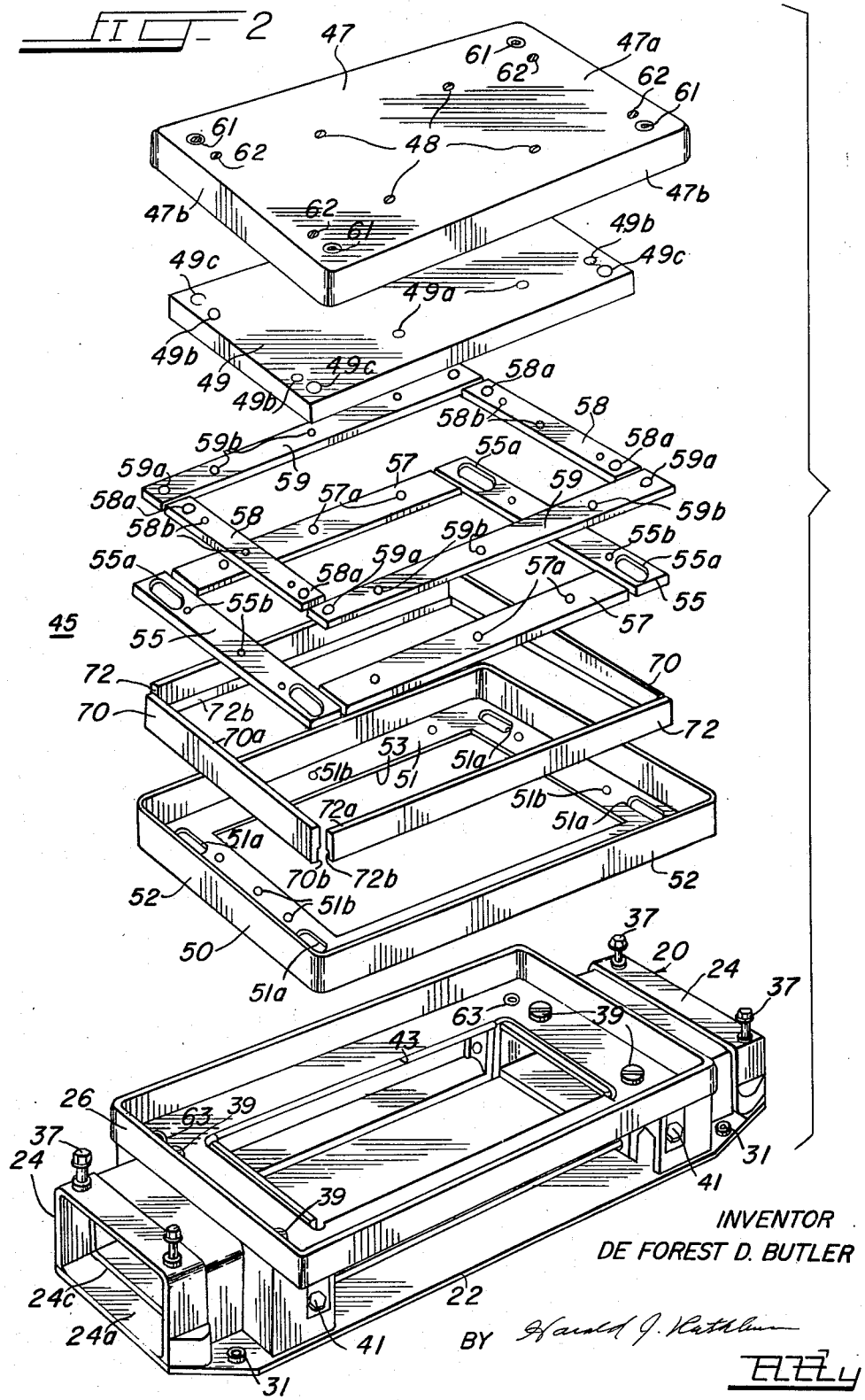

United States Patent Office 3,499,570
Patented Mar. 10, 1970

3,499,570
COVER ASSEMBLY FOR A JUNCTION BOX OF AN UNDERFLOOR ELECTRICAL WIRING SYSTEM
De Forrest D. Butler, Lexington, Ky., assignor to Square D Company, Park Ridge, Ill., a corporation of Michigan
Filed July 1, 1968, Ser. No. 741,384
Int. Cl. H02g 3/14
U.S. Cl. 220—3.3                                                22 Claims

ABSTRACT OF THE DISCLOSURE

A cover assembly for a relatively large underfloor junction box includes a frame assembly, a trim pan and a cover plate. The frame assembly includes a frame member which receives a plurality of interfitting reinforcing bars and a four-piece tile trim. The cover plate is received in the trim pan which in turn is received within the frame assembly to complete the structure of the cover assembly. The cover assembly is received within a complementary access box defining an opening into the junction box proper. The four-piece tile trim fits between the frame member and the trim pan, the pieces of tile trim being capable of selective assembly to provide either a thick or a thin tile trim or a flush surface.

---

This invention relates to an improvement in underfloor junction boxes for underfloor electrical wiring systems, and more particularly to an improved cover assembly for such junction boxes. Although the invention is particularly suitable for relatively large junction boxes, it can be utilized for smaller junction boxes as well.

A common form of underfloor junction box includes at least a pair of duct-receiving members forming part of an enclosure upon which is secured an upwardly-opening, generally rectangular, box-like access unit which receives a cover assembly. The improved cover assembly is for reception within such an access unit, and comprises a frame assembly, a trim pan and a cover plate. The frame assembly comprises an upwardly-opening generally rectangular box-like frame member stamped from sheet metal, a plurality of interfitting metal bars providing structural reinforcement for the frame member, and a four-piece tile trim.

The prior art cover structures for underfloor junction boxes generally comprise relatively heavy die castings which provide the strong and durable top assembly required to withstand heavy floor loads. The use of castings is desirable and economically feasible where the amount of usage can justify the initial tooling cost. However, for junction boxes of large size having a low usage, the tooling costs for castings cannot be justified and other methods of manufacture are desirable.

Accordingly, an object of the present invention is to provide an improved heavy and durable cover structure for a large underfloor junction box, the cover structure being assembled from bar and plate stock and sheet metal stampings.

Further objects and advantages will become apparent from the following description wherein reference is made to the drawings, in which:

FIG. 1 is a perspective view of a single-level junction box having a cover assembly constructed in accordance with this invention, the cover assembly being shown in a raised position;

FIG. 2 is an exploded perspective view of the junction box and cover assembly of FIG. 1;

FIG. 3 is a fragmentary sectional view taken generally along the line 3—3 of FIG. 1, the cover assembly being shown in a lowered position;

FIG. 4 is a fragmentary sectional view taken generally along the line 4—4 of FIG. 1, the cover assembly being shown in the lowered position and the main portion of the duct-receiving member being omitted; and FIG. 5 is a fragmentary sectional view of the cover assembly taken generally along the line 5—5 of FIG. 1.

Referring to the drawings, a single-level junction box 20 constructed in accordance with the principles disclosed in copending application for U.S. patent Ser. No. 638,-442 filed May 15, 1967, now Patent No. 3,405,834 and assigned to the assignee of the present invention, is shown as receiving a cover assembly constructed in accordance with the present invention, it being understood that the cover assembly is also usable with the two-level junction box disclosed in the aforesaid application as well as with similar single-level and two-level junction boxes.

The junction box 20 comprises a generally flat and rectangular base plate 22, a pair of identical duct-receiving members 24, which preferably are die castings, and an access unit 26 in the form of an upwardly-opening generally rectangular box. A cover assembly 29 in accordance with this invention is shown in FIG. 1 as received in the access unit 26.

The junction box 20 is adjustably mounted on four screws 30, only one of which is shown in FIG. 1, the screws being threaded into respective apertures 31 in the base plate 22 at the respective corner portions thereof. The screws 30 have a lower head portion (not shown) rotatably trapped between a pair of plate members 33 and 34 secured together in any suitable manner.

The duct-receiving members 24 are respectively secured, each by a plurality of upwardly-directed screws 36 (FIG. 3), to opposite end portions of the base plate 22, and each, in conjunction with its associated end portion of the base plate 22, defines an opening 24a for receiving an end portion of an underfloor wiring duct section 24b (FIG. 3). Each opening 24a is provided with an internal rib 24c extending transversely of the longitudinal axis of the duct section 24b and which engages the inner end face of the duct section 24b to limit its insertion into the opening 24a.

Each member 24 is provided with a pair of screws 37 for establishing electrical connections of low resistance between the member 24 and the duct section 24b received therein to form a good ground path.

The access unit 26 is mounted on the members 24, opposite end portions of the access unit 26 being secured respectively to the members 24 by a pair of screws 39. End portions of a pair of underfloor wiring duct sections (not shown), which in the embodiment disclosed would be wider than the duct sections 24b, may be received respectively on opposite sides of the junction box 20 between the members 24 and between the base plate 22 and the bottom of the access unit 26. Each member 24 is also provided on each side with a screw, such as the screws 41, for establishing a ground connection between the members 24 and the wider duct sections. The bottom wall of the access unit 26 is an annulus defined at its inner periphery by a relatively large centrally disposed rectangularly opening 43 affording access to the space within the junction box 20 between the ends of the duct sections. As mentioned, the access unit 26 receives the cover assembly 29.

The cover assembly 29 comprises a frame assembly 45, a trim pan 47, and a cover plate 49. The frame assembly 45 includes an upwardly-opening generally rectangular box-like frame member 50 made of relatively thin sheet metal and having a bottom wall 51 and four side walls 52. The bottom wall 51 is an annulus defined at its inner periphery by a relatively large centrally-disposed rectangular opening 53 corresponding in size to the opening 43 in the access unit 26 and having the edges of the opening aligned parallel to the four side walls 52, respectively. The frame assembly 45 further includes a plurality of relatively thick metal reinforcing bars and a four-piece tile trim to be described.

The reinforcing bars are positioned within the frame member 50 and are arranged in a flatwise double layer frame-shape with a bottom layer of four bars resting upon the bottom wall 51 and a top layer of four bars resting upon the bottom layer of bars. Because of the centrally-disposed opening 53, the bottom wall 51 of the frame member 50 comprises, in effect, two oppositely disposed end portions and two oppositely disposed side portions.

In order to provide adequate support for the cover assembly 29 within the access unit 26, it is desirable to maximize the available engageable surface area of the bottom walls of the access unit 26 and the frame member 50. To this end, the bottom wall 51 of the frame member 50 is provided with four elongated apertures 51a positioned respectively in the four corners of the bottom wall 51 and extending longitudinally inward of the end portions thereof, so that when the bottom wall 51 of the frame member 50 is in engagement with the bottom wall of the access unit 26, the inner end portions of the elongated apertures 51a receive the protruding head portions of the screws 39, respectively. This reception allows the bottom wall 51 of the frame member 50 to fit firmly against the bottom wall of the access unit while eliminating the necessity for utilizing a more expensive manufacturing process such as counterboring or offsetting the bottom wall 51 in the area of the screws 39.

Spaced lengthwise along the end and side portions of the bottom wall 51 are a plurality of holes 51b extending therethrough, three of the holes 51b being positioned in spaced-apart relation along each of the end and side portions between the apertures 51a. The double layer of reinforcing bars is secured to the frame member 50 by a plurality of flathead screws 54 (FIG. 5) which screws pass through the holes 51b, respectively, of the bottom wall 51 and extend through holes in the individual bars of the bottom layer thereof to be threadingly engaged within holes in the top layer of bars as will be described.

The bottom layer of bars comprises two end bars 55 and two side bars 57. Each of the end bars 55 has relatively large elongated apertures 55a in its opposite end portions, respectively, the apertures 55a corresponding generally in size to, and being respectively aligned with, the apertures 51a in the bottom wall 51. This general correspondence in size between the apertures 51a and 55a is provided to further accommodate the protruding head portions of the screws 39, respectively, without utilizing a counterbore or offset for the above-mentioned reasons, the protrusion of the head portions of the screws 39 remaining a consideration because the bottom wall 51 is relatively thin as compared to the reinforcing bars.

Each of the end bars 55 has three relatively small holes 55b extending therethrough and positioned in spaced-apart relation lengthwise along the intermediate portion of each bar between the apertures 55a, the holes 55b being aligned with the holes 51b, respectively.

The end bars 55 rest respectively upon the oppositely disposed end portions of the bottom wall 51, and the side bars 57 rest respectively upon oppositely disposed side portions of the bottom wall 51 and extend between the inner edge portions of the end portions of the two end bars 55 to complete the frame shape of the bottom layer of bars. Each of the side bars 57 has three relatively small holes 57a which extend between the lower and upper surfaces of the bar and are positioned in spaced-apart relation lengthwise along the bar, the holes 57a being aligned with the holes 51b, respectively.

Again, in consideration of providing a flatwise uniform contact between the bottom wall 51 and the bottom wall of the access unit 26, the screws 54 which secure the reinforcing bars to the frame member 50 are flathead screws and the holes 51b are countersunk to the extent of the thickness of the bottom wall 51. Because the bottom wall is relatively thin, it becomes desirable to countersink the holes 55b and 57a in order to accommodate the inner head portions of the flathead screws 54, respectively, thereby increasing the effectiveness of the securement of the double layer of reinforcing bars to the bottom wall 51 when the screws are threaded into the top layer of bars as will be described.

The top layer of bars comprises two end bars 58 and two side bars 59. Each of the end bars 58 has holes 58a in its opposite end portions, respectively, which holes align with the inner end portions of the associated and aligned elongated apertures 51a and 55a, respectively, when the end bars 58 are placed in position on the upper surface of the end bars 55. Further, each of the end bars 58 has three relatively small holes 58b which extend between the lower and upper surfaces of the bar and which are positioned in spaced-apart relation lengthwise along the intermediate portion of the bar between the end portions which contain the holes 58a, the holes 58b being threaded and aligned with the holes 55b for receiving the screws 54, respectively, as shown in FIG. 5.

The side bars 59 of the top layer of reinforcing bars rest respectively on the upper surface of the side bars 57 of the bottom layer with the end portions of the side bars 59 respectively overlying the end portions of the end bars 55 of the bottom layer of bars. The end bars 58 extend between the inner edge portions of the end portions of the two side bars 59 to complete the frame shape of the top layer of bars.

Each of the side bars 59 has holes 59a in its end portoins, respectively, which holes correspond in size to the holes 58a in the end bars 58. The holes 59a align with the outer end portion of the associated apertures 51a and 55a, respectively, when the side bars 59 are placed in position on the side bars 57 of the assembled bottom layer of bars. Since the associated apertures 51a and 55a are of larger diameter than the holes 59a, the lower circumferential edge portion, exposed by the apertures 51a and 55a, of each of the smaller diameter holes 59a defines a downwardly-facing shoulder portion. Further, each of the side bars 59 has three relatively small holes 59b which extend between the lower and upper surfaces of the bar and are positioned in spaced-apart relation lengthwise along the intermediate portion of the bar between the end portions which contain the holes 59a, the holes 59b being threaded and aligned with the holes 57a for receiving the screws 54, as shown in FIG. 5.

The width of the end bars 58 and side bars 59 of the top layer of bars is less than the width of the end bars 55 and side bars 57 of the bottom layer of bars, respectively. The inner edge faces of the end bars 58 are in alignment with the inner edge faces of the end bars 55, respectively, and the inner edge faces of the side bars 59 are in alignment with the inner edge faces of the side bars 57, respectively. This relative positioning of the top layer of bars with respect to the bottom layer of bars exposes the outer edge marginal areas of the upper surfaces of the end bars 55 and side bars 57 of the bottom layer of bars to present an annular upwardly-facing shoulder portion 60.

The trim pan 47 is a downwardly-opening generally rectangular pan made of relatively thin sheet metal and having a top wall 47a and four side walls 47b. The cover plate 49 is a solid plate which is received within the trim pan 47 to serve as a reinforcing means for the top wall 47a and has a thickness less than the height of the side walls 47b. A plurality of screws 48 extend through holes in the top wall 47a and are threaded into holes 49a in the cover plate 49, respectively, to thereby secure the cover plate 49 to the top wall 47a. The assembled trim pan 47 and cover plate 49 are received within the frame member 50 with the outer edge faces of the side walls 47b of the trim pan 47 resting upon the top layer of reinforcing bars 58 and 59, thereby spacing the lower surface of the cover plate from the reinforcing bars.

When the assembled trim pan 47 and cover plate 49 are received within the frame assembly 45, the outer surfaces of the side walls of the trim pan 47 and the outer edge faces of the double layer of reinforcing bars 55, 57, 58, and 59 are spaced from the inner surfaces of the respective side walls of the frame member 50, thereby defining an annular moat-like recess which exposes the annular upwardly-facing shoulder portion 60 of the bottom layer of bars 55 and 57 to present a stepped structure in the inner portion of the moat-like recess.

The assembled trim pan 47 and cover plate 49 are fastened to the frame assembly 45 by means of four screws 62 which extend respectively through holes in the top wall 47a, pass through holes 49b in the cover plate 49, and are threaded into holes 58a in the end bars 58, as shown in FIG. 4.

The cover assembly 29 is held in place by means of leveling screws 61 at each corner which extend respectively through holes in the top wall 47a of the trim pan 47, pass through holes 49c in the cover plate 49, the holes 59a in the side bars 59, and through the outer portion of the aligned and elongated apertures 55a and 51a into engagement with threaded holes 63 in the bottom wall of the access unit 26. Each casting member 24 loosely receives and conceals the inner end portions of the screws 61 in internal recesses, respectively, as best shown in FIG. 3. Each of the screws 61 has an enlarged cylindrical collar portion 64 intermediate of its ends defining an annular upper ledge surface 64a and a cylindrical head portion 65 having a reduced diameter portion 65a. The screws 61 are received in the cover assembly 29, respectively, by being inserted upwardly through the respective pairs of elongated apertures 51a and 55a so that the respective ledge surfaces 64a of the cylindrical collar portions 64 abut against the downwardly-facing shoulder portions surrounding the respective holes 59a on the bottom surfaces of the side bars 59, and the cylindrical head portions 65 extend through the respective holes 59a and 49c, to be exposed through respective openings in the top wall 47a of the trim pan 47.

Prior to the assembled trim pan 47 and cover plate 49 being received within the frame assembly 45, an arcuate fastener or clip, such as the clip 66 in FIG. 3, may be received within the reduced diameter portions 65a of the screws 61, to respectively capture the screws 61 within the holes 59a in the end portions of the side bars 59. When the assembled trim pan 47 and cover plate 49 are inserted within the receiving frame assembly 45, the spacing of the lower surface of the cover plate 49 from the top layer of reinforcing bars 58 and 59, as previously described, provides a space in which to receive the arcuate clips 66, thereby avoiding the need for recesses in the lower surface of the cover plate 49 at the respective circumferential edge portions of the holes 49c.

The four-piece tile trim comprises two relatively short pieces 70 and two relatively long pieces 72 which may be like the tile trim pieces disclosed in the above-mentioned copending application to which reference may be made for a more detailed description. As best shown in FIG. 2, each tile trim piece 72 is an elongated flat strip having a thick longitudinal edge portion 72a and an opposite stepped thin longitudinal edge portion 72b of less width than the edge portion 72a. Each of the short tile trim pieces 70 is similarly formed with a thick longitudinal edge portion 70a and an opposite stepped thin longitudinal edge portion 70b. The four tile trim pieces 70 and 72 are positioned in the stepped moat-like recess defined by the side walls of frame member 50 and the trim pan 47 and are in surrounding relation to the trim pan 47.

In FIG. 4, the projecting portion of the stepped edge portion 72b of one of the tile trim pieces 72 is shown projecting below the upwardly-facing shoulder 60 of one of the bars 55 so that the thick edge portion 72a is level with the upper surface of the cover assembly 29. Similarly, the pieces 70 have the stepped thin edge portion 70b projecting below the upwardly-facing shoulder portions 60 thereby to provide a flush floor fitting with no tile trim for the cover assembly 29.

The tile trim pieces 70 and 72 may be positioned within the moat-like recess so that the stepped thin edge portions 70b and 72b, respectively, rest upon the upwardly-facing shoulder portion 60. In this position, the thick edge portions 70a and 72a of the trim pieces 70 and 72, respectively, extend above the upper surface of the cover assembly 29, thereby to provide a thick tile trim for tile (not shown) laid over a concrete floor.

Further, the tile trim pieces 70 and 72 may be positioned within the moat-like recess so that the thick edge portions 70a and 72a rest upon the upwardly-facing shoulder portion 60 and the respective stepped thin edge portions 70b and 72b extend above the upper surface of the cover assembly 29, thereby to provide a thin tile trim for the tile (not shown) laid over the concrete floor.

If desired, an annular sealing or packing gasket 75 may be provided on an inner edge portion of the upper surface of the end bars 58 and side bars 59 to provide a seal between the top layer of bars and the cover plate 49, as shown in FIGS. 3 and 4.

What is claimed is:

1. A cover assembly for an underfloor junction box comprising an upwardly-opening generally rectangular box-like member made of relatively thin sheet metal and having four side walls and a bottom wall, the bottom wall having a centrally disposed access opening therein whereby the bottom wall is an annulus surrounding the access opening between the edges of the opening and the side walls, a plurality of relatively thick metal reinforcing bars supported on the bottom wall and surrounding the access opening, and a generally flat cover plate received within the frame member and disposed above the reinforcing bars in spaced relationship thereto.

2. A cover assembly as claimed in claim 1 wherein a downwardly-opening box-like trim pan made of relatively thin sheet metal is provided and has four side walls and a top wall, said cover plate is received within the trim pan with its upper surface in engagement with the lower surface of the top wall of the trim pan, the thickness of the cover plate is less than the height of the side walls of the trim pan, and the trim pan is received within the frame member with the lower edges of said side walls of the trim pan resting upon said reinforcing bars, whereby the lower surface of the cover plate is spaced from said reinforcing bars.

3. A cover assembly as claimed in claim 2 wherein means are provided for securing the cover plate to the top wall of the trim pan.

4. A cover assembly as claimed in claim 1 wherein means are provided for securing the reinforcing bars to the bottom wall of the frame member and means are provided for securing the cover plate to the reinforcing bars.

5. A cover assembly as claimed in claim 1 wherein the four side walls of the frame member are of equal height and the upper surface of the cover plate is substantially flush with the free edge faces of said four side walls.

6. A cover assembly as claimed in claim 1 wherein the outer periphery of the cover plate is spaced from the inner periphery of the four side walls of the frame member to define a moat-like recess therebetween, and a four-piece tile trim is received within said recess.

7. A cover assembly as claimed in claim 1 wherein the access opening is generally rectangular and the edges of the opening are parallel to the four side walls, respectively, and said plurality of reinforcing bars are arranged in a generally rectangular shape.

8. A cover assembly as claimed in claim 7 wherein the annular bottom wall has a pair of oppositely disposed side portions respectively positioned adjacent two oppositely disposed side walls of the frame member and a pair of oppositely disposed end portions respectively positioned adjacent the other two oppositely disposed side walls of the frame member, said side portions having a length greater than the length of said end portions, and said plurality of reinforcing bars include a pair of side bars supported respectively on said side portions and a pair of end bars supported respectively on said end portions.

9. A cover assembly as claimed in claim 8 wherein there is an additional layer of reinforcing bars resting on said reinforcing bars to provide a top layer and a bottom layer of bars, said top layer includes a pair of side bars disposed on the side bars of the bottom layer and a pair of end bars disposed on the end bars of the bottom layer.

10. A cover assembly as claimed in claim 9 wherein the end portions of said pair of end bars of said bottom layer underlie the end portions of the pairs of side bars of the top layer, respectively, the pair of end bars of the top layer extend between the inner edge portions of the end portions of the pair of side bars of the top layer, respectively, and the pair of side bars of the bottom layer extend between the inner edge portions of the end portions of the pair of end bars of the bottom layer, respectively.

11. A cover assembly as claimed in claim 9 wherein the cover plate contains a hole in each of the corner areas thereof, the end portions of the side bars of the top layer contain relatively small holes, respectively, which are aligned with the holes in the cover plate, respectively, the end portions of the end bars of the bottom layer contain relatively large holes, respectively, which are aligned with the relatively small holes in the top layer, the lower circumferential edge portion of each of the smaller diameter holes in the side bars of the top layer defining a downwardly-facing shoulder portion, and the bottom wall of said frame member has relatively large holes in the corner areas thereof, respectively, which are aligned with the respective relatively large holes in the end bars of the bottom layer of bars.

12. A cover assembly as claimed in claim 11 wherein means is provided for securing the cover assembly to the junction box, said means comprises a plurality of relatively long screws respectively having cylindrical head portions, enlarged collar portions, and threaded shaft portions, said cylindrical head portions extending respectively through the holes in the corners of the cover plate and the relatively small holes in the side bars of the top layer, said enlarged collar portions being received respectively within the relative large holes in the end bars of the bottom layer and engaging said downwardly-facing shoulder portions, respectively, to limit the extent which the head portions are received within their respective holes in the cover plate and side bars, said threaded shaft portions extending respectively through the relatively large holes in the bottom wall of the frame member for threaded reception respectively in suitable holes in the junction box.

13. A cover assembly as claimed in claim 12 wherein the cylindrical head portion of each of said screws has a reduced diameter portion which receives an arcuate clip, and said clip forms a shoulder portion which overlies the upper circumferential edge portion of its associated one of the relatively small holes in the side bars of the top layer for preventing withdrawal of the screws therefrom, each of said clips being positioned between the top layer of bars and the cover plate.

14. A cover assembly as claimed in claim 7 wherein said cover plate has a pair of spaced holes in each of the corner areas thereof, the end portions of the reinforcing bars at the corners of the rectangular arrangement of bars contain spaced pairs of holes, respectively, each of the holes in the cover plate being aligned with one of the holes in the bars, and the bottom wall of said frame member contains an elongated opening at each of the corner areas thereof aligned respectively with the pairs of holes in the reinforcing bars and cover plate.

15. A cover assembly as claimed in claim 14 wherein a first fastening means is provided for securing the cover assembly to a junction box, a second fastening means is provided for securing the reinforcing bars to the bottom wall of the frame member, a third fastening means is provided for securing the cover plate to the reinforcing bars, said first fastening means comprises a plurality of relatively long screws, each of said relatively long screws extending through one aligned hole of each pair of holes in the cover plate and reinforcing bars, through one of the aligned elongated openings in the bottom wall for threading into an opening in the junction box, and said third fastening means comprises a plurality of relatively short screws, each of said relatively short screws extending through the other holes in the cover plate and threaded into the other aligned hole of each pair of holes in the reinforcing bars.

16. A cover assembly as claimed in claim 7 wherein there are two layers of reinforcing bars supported on the bottom wall.

17. A cover assembly as claimed in claim 16 wherein the two layers of reinforcing bars comprise a top layer and a bottom layer of equal numbers of bars, the width of the bars of the top layer is less than the width of the bars of the bottom layer, the inner edge faces of the bars of the top layer are in alignment with the inner edge faces of the bars of the bottom layer, respectively, so that the outer edge marginal areas of the upper surfaces of the bars of the bottom layer are exposed to present an annular upwardly-facing shoulder portion.

18. A cover assembly as claimed in claim 17 wherein a downwardly-opening box-like trim pan made of relatively thin sheet metal is provided and has four side walls and a top wall, said cover plate is received within the trim pan, and the trim pan is received within the frame member with the free edge faces of its side walls resting upon the top layer of reinforcing bars.

19. A cover assembly as claimed in claim 18 wherein the four side walls of the frame member are of equal height and the upper surface of the top wall of the trim pan is substantially flush with the free edge faces of the four side walls of the frame member.

20. A cover assembly as claimed in claim 19 wherein the outer surfaces of the side walls of the trim pan and the outer edge faces of the reinforcing bars of the bottom layer are spaced from the inner surfaces of the respective side walls of the frame member, thereby defining an annular moat-like recess containing said upwardly-facing shoulder portion, and a four-piece tile trim is received within the recess.

21. A cover assembly as claimed in claim 20 wherein each of the separate pieces of tile trim include a thick longitudinal edge portion and an opposite stepped thin longitudinal edge portion, each of the pieces of tile trim are selectively receivable in said recess in three ways, namely, a first way in which the stepped edge portion projects below said soulder portion and the thick edge portion is substantially flush with the upper surface of the top wall of the trim pan; a second way in which the stepped edge portion engages the shoulder portion in said recess and the thick edge portion extends above the upper surface of the top wall of the trim pan to present a relatively thick tile trim projecting upwardly from the upper surface of the top wall of the trim pan; and a third way in which the thick edge portion engages the shoulder portion and the stepped edge portion extends above the upper surface of the top wall of the trim pan to present a relatively thin tile trim projecting upwardly from the upper surface of the top wall of the trim pan.

22. A cover assembly for an underfloor junction box comprising an upwardly-opening box-like frame member made of relatively thin sheet metal and having four side walls and a bottom wall, said bottom wall having a centrally disposed generally rectangular access opening therein defining a peripheral marginal area surrounding the access opening between the edges of the opening and the side walls of the frame member, said edges of the opening being parallel to the four side walls of the frame member, respectively, a plurality of relatively thick metal bars supported on the marginal area and surrounding the access opening forming a generally rectangularly-shaped first layer of reinforcing bars, a plurality of relatively thick metal bars supported on the first layer of bars and forming a generally rectangularly-shaped second layer of bars, a cover plate received within the frame member and disposed above said second layer of reinforcing bars in spaced relationship thereto and in spaced relationship to the four side walls of the frame member defining a moat-like recess surrounding the cover plate, and a four-piece tile trim insertably received within said recess.

References Cited

UNITED STATES PATENTS

| | | | |
|---|---|---|---|
| 3,029,964 | 4/1962 | Hudson et al. | 220—3.4 |
| 3,070,252 | 12/1962 | Reiland | 220—3.4 |
| 3,187,922 | 6/1965 | Hoskins et al. | 220—3.4 |
| 3,204,378 | 9/1965 | Stuessel et al. | 220—3.7 X |
| 3,405,834 | 10/1968 | Butler et al. | 220—3.4 |
| 3,414,154 | 12/1968 | Rose et al. | 220—3.7 |

JOSEPH R. LECLAIR, Primary Examiner

J. R. GARRETT, Assistant Examiner

U.S. Cl. X.R.

220—3.7, 3.8